Figure 3:
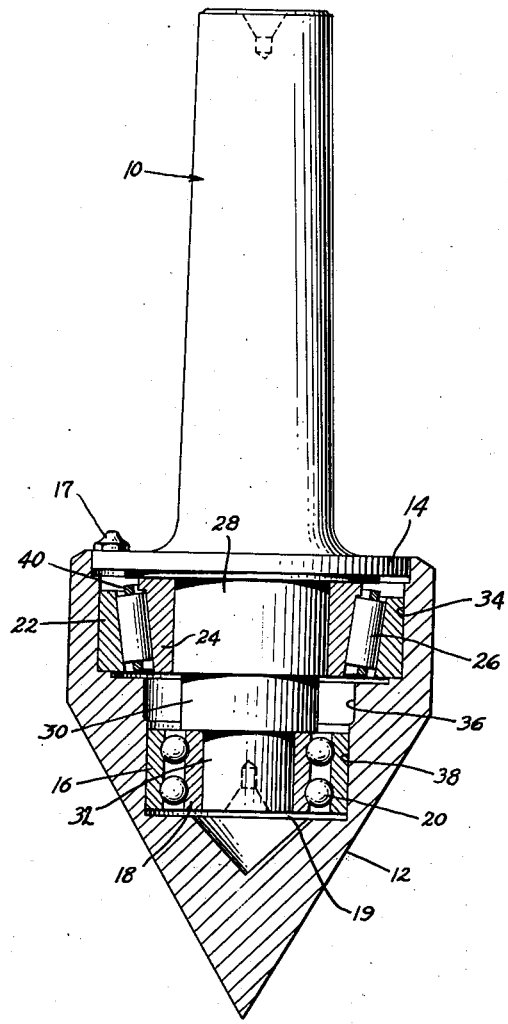

Nov. 14, 1944.   C. J. FOUCHEY   2,362,812
LIVE CENTER
Filed March 16, 1944   2 Sheets-Sheet 1
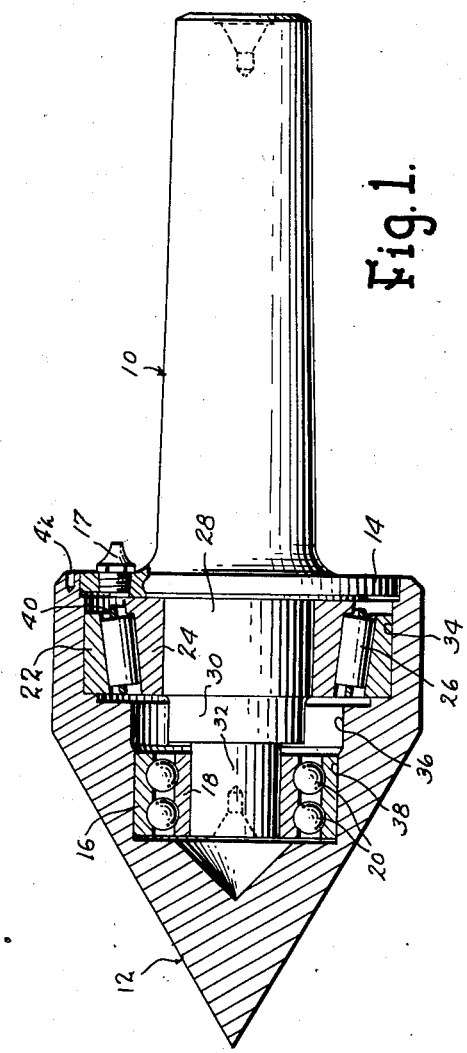
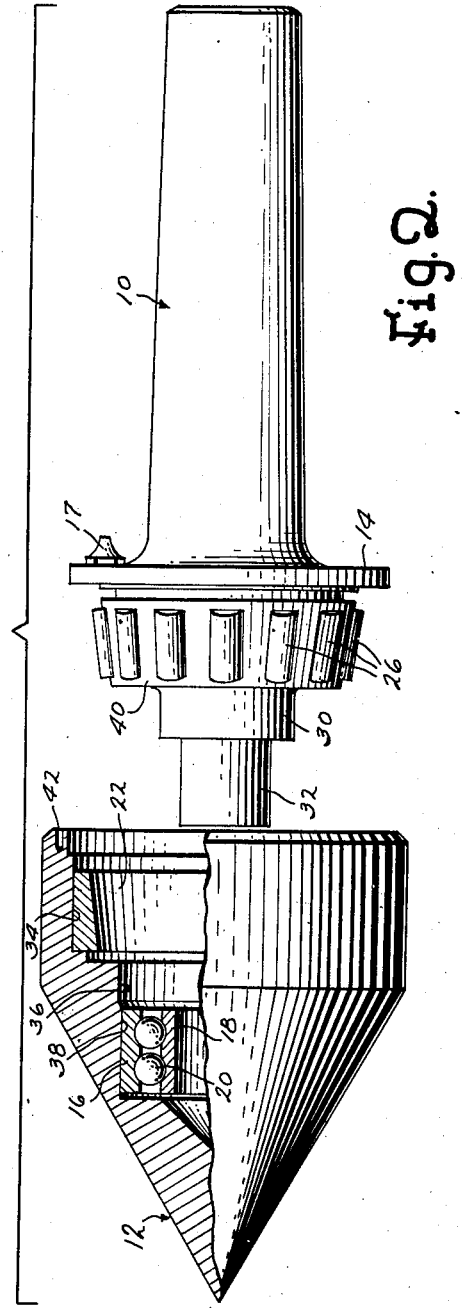
INVENTOR.
Charles J. Fouchey
BY Parker and Burton
Attorneys Nov. 14, 1944.    C. J. FOUCHEY    2,362,812
LIVE CENTER
Filed March 16, 1944    2 Sheets-Sheet 2

INVENTOR.
Charles J. Fouchey
BY
Parker & Burton
ATTORNEYS

Patented Nov. 14, 1944

2,362,812

UNITED STATES PATENT OFFICE 2,362,812

LIVE CENTER

Charles J. Fouchey, Ecorse, Mich.

Application March 16, 1944, Serial No. 526,677

2 Claims. (Cl. 82—33)

This invention relates to centering devices and particularly to a center rotating with the work. This application is a continuation in part of application Serial No. 401,683, filed July 9, 1941.

An important object of this invention is to provide a centering device of great strength, rigidity and durability, and one which is capable of being made in unlimited sizes for all kinds of work. Another object of this invention is to provide a novel line centering device formed of few parts and assembled in a novel manner for holding and rotating the center member on its support. A further object of this invention is to provide a novel form of centering device which is economical to make and easy to assemble and which will maintain its accurate centering over long periods of time.

More specifically, it is an important object of this invention to provide a centering device including an improved rotating center member and a supporting shank member therefor and means in the form of novel ball and roller bearing assemblies acting to journal the center member on the shank member. In the preferred form of the invention, the center member is shaped with a bell housing which encloses an end of the shank member and between which the bearing assemblies are mounted. Novel means is employed to hold the center member to the supporting shank member. This means utilizes the elements hereinabove mentioned and no additional parts are necessary to accomplish this purpose. To hold the center member on the shank member the races of the bearing assemblies are employed for this purpose and are designed for press fitted engagement with the walls of the center and shank members. Preferably, the press fitted parts constitute the sole means for holding the two members together. As a result, the same means which provides rotational movement of the center member also functions to secure the member to the supporting shank member.

Another object of this invention is to provide a novel means for taking up the wear of the bearings, especially those receiving the thrust, without affecting the proper alignment of the center member with the axis of rotation. This novel means functions automatically during the operation of the device and requires no additional parts.

More particularly an axial thrust-bearing assembly is mounted upon the shank member, spaced inwardly from the outer end thereof, and transmits the axial thrust of the center member to the shank member. A radial thrust-bearing assembly is mounted upon the shank member, adjacent to its outer end, and transmits radial thrust of the center member to the shank member. Axial clearances are provided between said members whereby upon wear of the axial thrust-bearing assembly the center member is permitted to shift inwardly telescoping over the shank member. During this telescoping adjustment to take up for wear of the axial thrust-bearing assembly the radial thrust-bearing assembly may shift with one of said members relative to the other member.

Various other objects, advantages and meritorious features of this invention will become more fully apparent from the following specification, appended claims and accompanying drawings, wherein:

Figure 1 is a longitudinal sectional view through a centering device constructed in accordance with this invention showing the parts in assembled condition, Figure 2 is a view partly in elevation and partly in section showing the parts of the centering device in separated condition just prior to the final assembly operation, Figure 3 is a cross sectional view taken on the same line as Figure 1 showing a slightly modified form of assembly as compared with that of Figure 1.

Referring more particularly to the drawings, the illustrated embodiment of the invention therein comprises a supporting member 10 referred to as the shank member and a work engaging member 12 referred to as the center member. As is customary, the shank member 10 is adapted to be mounted on the tail stock of a lathe or similar machine. The center member engages the work but in this instance is journaled on the shank member in order to rotate with the work. The end of the center member which engages the work is shown in the drawings as tapering to a point but it is understood that the center member may be shaped in various other ways for engagement with the work.

The center member 12 is hollowed out to form a circular or bell-shaped housing which faces toward and encloses the outer end section of the shank. On the shank is a relatively thin radial flange 14 disposed in such position to the center member that when the latter is properly assembled as shown in Fig. 1, it fits the inside wall of the housing and is substantially flush with the inner end thereof. The flange 14 does not serve as a support for the center member but merely as a wall closing the space between the housing.

In the flange and projecting rearwardly therefrom is a fitting 17 through which lubricant may be fed to the interior of the bell housing. The flange 14 cooperates with the housing to form a seal against the escape of lubricant. It is only at this point in the device where lubricant can escape. The flange 14 is telescopically receivable within the center member as permitted by the provided clearance between the flange and the shoulder 34 of the center member during take-up for wear as hereinafter described.

Between the bell housing of the center member and the enclosed end of the shank are bearing assemblies for rotatably journaling the former on the latter. These assemblies comprise a ball bearing assembly including an outer race 16, an inner race 18 and ball bearings 20; and a roller tapered bearing assembly including an outer race 22, an inner race 24 and roller bearings 26. The roller bearing assembly is preferably of larger diameter and is preferably disposed rearwardly of the ball bearing assembly. The latter, as shown, is fitted on the extreme end of the shank member.

In order to mount the bearing assemblies between the two members, each member is provided with a series of progressively decreasing annular concentric shoulders. The shank member is provided with a large shoulder 28 immediately adjacent to the flange 14, an intermediate shoulder 30 and a small shoulder 32 on the extreme end thereof. In corresponding manner the center member is provided with an internal large shoulder 34 and an internal intermediate shoulder 36 and an internal small shoulder 38. When the members are properly assembled, their respective shoulders appear opposite one another in concentric spaced relationship as shown in Fig. 1. The races of the ball bearing assembly bear against the smallest diameter shoulders 32 and 38 of the two members, and the races of the roller bearing assembly bear against the largest diameter shoulders 28 and 34 of the two members.

It is evident from the drawings that the ball bearing assembly takes the radial pressure imposed by the center member and the roller bearing assembly takes the axial pressure and also a part of the radial pressure of the center member. The roller bearings are inclined so that their axes all converge to a point on the work engaged by the center member. The projection of the roller bearing axes to a common meeting point on the work improves the rigidity and strength of the device. The location of the bell housing on the center member so that it encloses the shank member enables center members of various sizes to be used for a given shank member. Depending upon the character of the work to be performed, larger bearings can be used and the outside of the center member can be shaped to conform to any job for which the tools might be designed.

The centering device of the present invention consists of few parts. In the illustrated embodiment, only four separable parts are used, namely, the shank member 10, the center member 12, and the two bearing assemblies. Preferably a feature of the invention contributing to the economy in the number of parts used and to the strength, rigidity and accuracy of the device is the novel means for holding the center member on the shank member. This means utilizes the races of the bearing assemblies, particularly those of the ball bearing assembly for holding the center member to the shank member. This is accomplished by press fitting the races of the ball bearing assembly into engagement with the shoulder portions of the members against which they bear. In the present embodiment of the invention, the outer race 16 of the ball bearing assembly is press fitted into engagement with the shoulders of the bell housing, and the inner race 18 is press fitted into engagement with the shoulder 32 of the shank member. The inner confronting faces of the races 16 and 18 are grooved circumferentially opposite one another to provide channel runways for the ball bearings 20. As a result, when the parts are assembled, as shown in Figure 1, and the races of the ball bearing assembly are in press fitted engagement with the adjacent surfaces of the two members, the position assumed by the ball bearings in the runways functions to lock the center member against axial separation from the shank member. Thus the ball bearing assembly has the dual function of providing frictionless rotation of the center member at the same time holding the center member on the shank member.

Similarly, the races 22 and 24 of the roller bearing assembly are press fitted into engagement with the surfaces of the members which they engage. However, since in the illustrated embodiment of the invention these races are not grooved on their confronting faces or provided with other means which hold the races from axial displacement with respect to one another, the roller bearing assembly does not function as the ball bearing assembly to hold the center member on the shank member. It is to be understood, however, that such provision may be made if desired and that such modification falls within the scope of this invention.

Figure 2 illustrates the position assumed by the parts just prior to the final assembly operation of the structure assembled as shown in Figure 1. The ball bearing assembly is disposed deep in the bell housing of the center member with the outer race 16 in press fitted engagement with the shoulder 38. Initially it was forced therein as readily understood. The inner race 18 is carried by the ball bearing assembly. The inner diameter of this race is such that when the bell housing is forced over the reduced end of the shank member it will telescope into press fitted engagement with the smallest shoulder 32 of the shank member. As a result the center member will be locked as well as rotatably journaled on the shank member.

However, prior to the assembly of the two members 10 and 12, the tapered roller bearing assembly is mounted in position. The outer race 22 is press fitted into engagement with the shoulder 34 of the housing. The inner race 24 is press fitted into engagement with the shoulder 28 of the shank. The rollers are disposed in a cage formed by an annular tapered member 40 and for convenience is assembled on the inner race 24 just prior to the complete assembly operation as shown in Figure 2. The roller bearings 26 will assume the position shown in Fig. 1 when the assembly operation is completed.

Preferably the press fit between the bearing races and the shoulders is on the basis of .0005 of an inch. That is to say, the diameters of the inner races are made .0005 of an inch less than the shoulders which they engage and the diameters of the outer races are made .0005 of an inch greater than the shoulders which they engage. However, the extent of the press fitted engagement may be varied to suit different conditions.

An important feature of the invention is the provision for automatically taking up the wear of the bearings, especially the roller bearings which receive the axial thrust of the center member. This take-up is accomplished without affecting the accuracy of the alignment of the point of the center member.

As shown in the assembled view in Fig. 1 there is a slight clearance between the inner race 18 of the ball bearing assembly and the shoulder 30. This may be provided by making shoulder 32 slightly longer than the width of the race 18. Shoulder 36 of the bell housing is recessed on its rear edge to bear only upon the outer race 22 of the roller bearing assembly providing a clearance outwardly axially within the center beyond the inner race 24. Rearwardly axially of the outer race 22 there is a clearance as compared with the shank member.

The result is that as the roller bearings wear in use, the inner race 18 of the ball bearing assembly is permitted a slight axial slip on shoulder 32. This allows the center member to shift toward the shank member in infinitesimal amounts to take up the wear on the roller bearings. The press fit between the inner race 18 and the shoulder 32 is such that normally it is impossible to move one with respect to the other. However, under heavy axial pressures encountered in use, the press fit will yield and permit a slight slippage between the race 18 and the shoulder 32, just sufficient to take up any slack or play which might otherwise occur as the roller bearings wear in use.

This automatic adjustment is important otherwise as wear takes place a slight play or wobbly movement between the center member and the roller bearings might result which under the high speeds and the bearing pressures encountered in use would be quickly accentuated to the point where the tool will be useless in a short time. This self-adjustment assures long accurate use of the tool.

In Figure 3 the inner race 18 of the ball bearing assembly is seated at its inner end against the shoulder 30 on the shank and there is provided a clearance between the outer end of this ball bearing assembly and the center member as indicated at 19. In this form of assembly the center member will telescope inwardly relative to the shank member and relative to the ball bearing assembly which is seated against the shoulder 30 of the shank member to take up for wear of the axial thrust-bearing assembly.

In the telescoping adjustment of the center member relative to the shank member to take up for wear of the axial thrust-bearing assembly the outer race 22 of the roller bearing assembly can shift axially with the center member relative to the shank member and the inner race 24 of the roller bearing assembly. Such inner race 24 of the roller bearing assembly is held to the shank to shift therewith. Clearance beyond the outer end of the inner race 24 and beyond the inner end of the outer race 22 permits this shiftable take-up.

What I claim is:

1. A live center comprising, in combination, a shank having an outer shoulder at one end and a second outer shoulder spaced axially therefrom the first shoulder, a hollow center receivable over said end of the shank and having a pair of axially spaced internal shoulders disposed complementary to and spaced radially from the shoulders of the shank when the center is received thereover, a roller bearing assembly having an inner race fitted upon the second shoulder of the shank and axially abutting the shank at its inner end and an outer race fitted within the complementary shoulder of the center and axially abutting the center at its outer end, said bearing assembly taking the axial thrust of the center upon the shank, a ball bearing assembly having an inner race fitted upon the first shoulder of the shank and an outer race fitted within the complementary shoulder of the center, said shank having an axial clearance between the said bearing assemblies permitting movement of the ball bearing assembly and center relative to the first shoulder of the shank and toward the second shoulder thereof upon wear of the roller bearing assembly to compensate therefor.

2. A live center comprising, in combination, a shank member, a hollow center member received over the end of the shank, an axial thrust bearing assembly mounted upon the shank spaced from its end and supporting the center for rotation thereupon, said bearing assembly having its inner race axially abutting at its inner end the shank member and at its outer end spaced axially from the center member providing a clearance therebetween, said bearing assembly having its outer race axially abutting at its outer end the center member, said shank having a clearance axially rearwardly of the inner end of the outer race of said bearing assembly permitting axial shifting of said outer race with the center relative to the shank and the inner race of said bearing assembly and transmitting axial thrust from the center member through the bearing assembly upon the shank member, a radial thrust bearing assembly mounted upon the shank adjacent to its end supporting the center for rotation thereupon and taking the radial thrust of the center member upon the shank member, said shank member provided with an axial clearance axially adjacent to the rear end of the radial thrust bearing assembly and between said member and assembly permitting said center member and bearing assembly to shift and telescope inwardly upon the shank member as permitted by said clearance to take up for wear of the axial thrust bearing assembly.

CHARLES J. FOUCHEY.